United States Patent
Andreessen et al.

(10) Patent No.: US 8,346,950 B1
(45) Date of Patent: Jan. 1, 2013

(54) HOSTED APPLICATION SERVER

(75) Inventors: Marc L. Andreessen, Palo Alto, CA (US); Steven Vassallo, Redwood City, CA (US); Dermot Martin Gately, San Bruno, CA (US); Eric Reed Meeks, San Francisco, CA (US)

(73) Assignee: Glam Media, Inc., Brisbane, CA (US)

(*) Notice: Subject to any disclaimer, the term of this patent is extended or adjusted under 35 U.S.C. 154(b) by 964 days.

(21) Appl. No.: 11/134,250

(22) Filed: May 19, 2005

(51) Int. Cl.
G06F 15/16 (2006.01)
G06F 7/00 (2006.01)

(52) U.S. Cl. .................. 709/229; 707/600; 707/705

(58) Field of Classification Search .................. 709/229; 715/234, 239; 719/311
See application file for complete search history.

(56) References Cited

U.S. PATENT DOCUMENTS

| | | | |
|---|---|---|---|
| 5,446,891 A | 8/1995 | Kaplan et al. | |
| 5,892,905 A * | 4/1999 | Brandt et al. | 726/11 |
| 6,009,410 A | 12/1999 | LeMole et al. | |
| 6,167,522 A * | 12/2000 | Lee et al. | 726/2 |
| 6,314,451 B1 | 11/2001 | Landsman et al. | |
| 6,356,934 B1 | 3/2002 | Delph | |
| 6,754,885 B1 | 6/2004 | Dardinski et al. | |
| 6,766,298 B1 | 7/2004 | Dodrill et al. | |
| 6,934,740 B1 | 8/2005 | Lawande et al. | |
| 7,043,716 B2 * | 5/2006 | Zimmer et al. | 717/107 |
| 7,139,761 B2 | 11/2006 | McKibben et al. | |
| 7,149,287 B1 * | 12/2006 | Burger et al. | 379/88.17 |
| 7,269,590 B2 | 9/2007 | Hull et al. | |
| 7,281,008 B1 | 10/2007 | Lawrence et al. | |
| 7,433,876 B2 | 10/2008 | Spivack et al. | |
| 7,451,434 B1 | 11/2008 | Blumenthal et al. | |
| 7,502,855 B2 | 3/2009 | Swanson et al. | |
| 2001/0051985 A1 * | 12/2001 | Haverstock et al. | 709/206 |
| 2003/0105811 A1 | 6/2003 | Laborde et al. | |
| 2003/0149975 A1 | 8/2003 | Eldering et al. | |
| 2003/0187921 A1 * | 10/2003 | Diec | 709/203 |
| 2004/0083264 A1 | 4/2004 | Veselov | |
| 2004/0143569 A1 | 7/2004 | Gross et al. | |
| 2004/0187136 A1 | 9/2004 | Bhogal et al. | |
| 2005/0015809 A1 | 1/2005 | Boys | |
| 2005/0071345 A1 | 3/2005 | Lin | |
| 2005/0097006 A1 | 5/2005 | Nyako | |
| 2005/0102324 A1 | 5/2005 | Spring et al. | |
| 2005/0138564 A1 | 6/2005 | Fogg | |
| 2005/0149500 A1 | 7/2005 | Marmaros et al. | |
| 2005/0160094 A1 * | 7/2005 | Morgenstern et al. | 707/9 |
| 2005/0193054 A1 | 9/2005 | Wilson et al. | |
| 2005/0216300 A1 | 9/2005 | Appelman et al. | |

(Continued)

OTHER PUBLICATIONS

Sun—J2EE Developer's Guide—Scenarios, Author: Sun Microsystems, Inc, pp. 1-4 http://web.archive.org/web/20011119203713/java.sun.com/j2ee/sdk_1.2.1/techdocs/guides/ejb/html/Security4.html.*

(Continued)

*Primary Examiner* — Kenny Lin
*Assistant Examiner* — Noel Beharry
(74) *Attorney, Agent, or Firm* — Dergosits & Noah LLP (57) ABSTRACT

A hosted application server system and method are disclosed. The hosted application server system includes an interface for receiving a request from one of a plurality of users, a runtime environment for running a plurality of independent applications, a core configured to receive and respond to a request from one of the applications, and an interface for sending a response to the user. The core can have access to a shared data model.

35 Claims, 6 Drawing Sheets

U.S. PATENT DOCUMENTS

| | | | |
|---|---|---|---|
| 2006/0026668 A1* | 2/2006 | Karoubi | 726/4 |
| 2006/0106878 A1* | 5/2006 | Shitomi et al. | 707/200 |
| 2006/0122974 A1* | 6/2006 | Perisic | 707/3 |
| 2006/0195460 A1 | 8/2006 | Nori et al. | |
| 2006/0195521 A1 | 8/2006 | New et al. | |
| 2006/0242178 A1 | 10/2006 | Butterfield et al. | |
| 2006/0242554 A1 | 10/2006 | Gerace et al. | |
| 2006/0248573 A1* | 11/2006 | Pannu et al. | 726/1 |
| 2007/0011273 A1* | 1/2007 | Greenstein et al. | 709/217 |
| 2007/0088671 A1 | 4/2007 | McElroy et al. | |
| 2008/0086564 A1* | 4/2008 | Putman et al. | 709/227 |
| 2008/0201299 A1 | 8/2008 | Lehikoinen et al. | |

OTHER PUBLICATIONS

The webSphere Application Server architecture and programming model, vol. 37, No. 3, 1998, Author: E. Bayeh http://www. research.ibm.com/journal/sj/373/bayeh.html.*

A Distributed Implementation of the Shared Data-Object Model, Author: Henri E. Bal, M. Frans Kaashoek, Andrew S. Tanenbaum, Publication: 1989 http://citeseerx.ist.psu.edu/viewdoc/summary?doi=10.1.1.45.1878.*

Creation of a Learning Landscape: Weblogging and social networking in the context of e-portfolios, Author: David Tosh & Ben Werdmuller, The University of Edinburgh, Published: Jul. 15, 2004 http://eduspaces.net/bwerdmuller/files/61/179/Learning_landscape.pdf.*

Global vs. Community Metadata Standards: Empowering Users for Knowledge Exchange, Author: Marek Hatala and Griff Richards, Technical University of British Columbia, Published: Jan. 1, 2002 http://lore.iat.sfu.ca/pubs/sw2002-hatala-richards.pdf.*

Author Unknown, Sun Java System Application Server, http://www.sun.com/software/products/appsrvr/index.xml.

Jotspot, Jotspot—The Application Wiki, http://www.jot.com/index.php.

Customforce, Customizable CRM-Salesforce.com, www.customforce.com.

Blogger, Blogger: Create your Blog Now, http://www.jot.com/index.php.

Textdrive, http://www.textdrive.com/.

Yahoo, Yahoo! GeoCities, http://geocities.yahoo.com/.

Bluehost, Web hosting provider—Bluehost.com, http://www.bluehost.com/.

Macromedia, ColdFusion MX 7, http://www.macromedia.com/software/coldfusion/.

BEA, BEA Systems, http://www.bea.com/framework.jsp?CNT=homepage_main.jsp&FP=/content.

IBM, IBM WebSphere Software, http://www-306.ibm.com/software/websphere/#.

JBoss, JBoss.com-Professional Open Source™ from JBoss Inc. , http://www.jboss.com/.

Blogging Software, Business Blogs & Blog Services at TypePad.com, www.typepad.com.

Apache Tomcat, The Apache Software Foundation, http://tomcat.apache.org/.

The Apache Software Foundation, http://apache.org/.

Archive of Flickr, "Photo Tags," www.flickr.com/photos/tags, pp. 1-3, [Online] [Archived by http://archive.org on Jun. 7, 2004; Retrieved on Nov. 25, 2007] Retrieved from the Internet<URL:http://web.archive.org/web/20040607053757/http://www.flickr.com/photos/tags>.

Archive of Flickr Photo Sharing Website, www.flickr.com/photos/tags, pp. 1-2, [Online] [Archived by http://archive.org on Apr. 24, 2005; Retrieved on Aug. 30, 2008] Retrieved from the Internet<URL:http://http://web.archive.org/web/20050424233308/flickr.com/photos/tags/>.

Archive of Mathes, A. "Folksonomies—Cooperative Classification and Communication Through Shared Metadata," pp. 1-20, [Online] [Archived by http://archive.org on Dec. 30, 2004; Retrieved Nov. 25, 2007] Retrieved from the Internet<URL:http://web.archive.org/web20041230205122/http://www.adammathes.com/academic/computer-mediated-communication/folsonomies.html>.

Linderman, M. "The Spread of Weighted Lists," Dec. 2, 2004, pp. 1-4, [Online] [Retrieved on Nov. 25, 2007] Retrieved from the Internet<URL:http://www.37signals.com/svn/archives/000937.php>.

Sturtz, D.N., "Communal Categorization: The Folksonomy," Dec. 16, 2004, pp. 1-8, [Online] [Retrieved on] Retrieved from the Internet<URL:http://www.davidsturtz.com/drexel/622/sturtz-folksonomy.pdf>.

U.S. Office Action, U.S. Appl. No. 11/141,983, Sep. 3, 2008, 17 pages.

U.S. Office Action, U.S. Appl. No. 11/141,983, Mar. 18, 2009, 15 pages.

U.S. Office Action, U.S. Appl. No. 11/195,378, Mar. 10, 2008, 44 pages.

U.S. Office Action, U.S. Appl. No. 11/195,378, Sep. 29, 2008, 42 pages.

U.S. Office Action, U.S. Appl. No. 11/195,349, Aug. 19, 2008, 12 pages.

U.S. Office Action, U.S. Appl. No. 11/195,349, Apr. 3, 2009, 9 pages.

U.S. Office Action, U.S. Appl. No. 11/213,309, Dec. 23, 2008, 21 pages.

U.S. Office Action, U.S. Appl. No. 11/195,378, Jun. 23, 2009, 46 pages.

United States Notice of Allowance and Fee(s) Due, U.S. Appl. No. 11/213,309, Jun. 26, 2009, 13 pages.

United States Office Action, U.S. Appl. No. 11/134,250, Jun. 23, 2008, 23 pages.

United States Office Action, U.S. Appl. No. 11/134,250, Nov. 18, 2008, 50 pages.

United States Office Action, U.S. Appl. No. 11/134,250, May 5, 2009, 26 pages.

United States Office Action, U.S. Appl. No. 11/134,250, Dec. 15, 2009, 20 pages.

United States Office Action, U.S. Appl. No. 11/141,983, Jan. 9, 2008, 16 pages.

United States Office Action, U.S. Appl. No. 11/213,309, Nov. 28, 2007, 19 pages.

United States Office Action, U.S. Appl. No. 11/195,349, Oct. 8, 2009, 9 pages.

United States Office Action, U.S. Appl. No. 11/195,378, Dec. 18, 2009, 52 pages.

United States Office Action, U.S. Appl. No. 11/195,378, May 25, 2010, 74 pages.

Author Unknown, Sun Java System Application Server, http://www.sun.com/software/products/appsrvr/index.xml, Pub: Jul. 20, 2005.

Jotspot, Jotspot—The Application Wiki, http://wwvv.jot.com/index.php, Pub: Jul. 22, 2005.

Customforce, Customizable CRM—Salesforce.com, www.customforce.com, Pub: Jul. 22, 2005.

Blogger, Blogger: Create your Blog Now, http://www.jot.com/index.php, Pub: Jul. 15, 2005.

Textdrive, http://www.textdrive.com/, Pub: Jul. 20, 2005.

Yahoo, Yahoo! GeoCities, http://geocities.yahoo.com/, Pub: Jul. 15, 2005.

Bluehost, Web hosting provider—Bluehost.com, http://www.bluehost.com/, Pub: Jul. 15, 2005.

Macromedia, ColdFusion MX 7, http://www.macromedia.com/software/coldfusion/, Pub: Jul. 15, 2005.

BEA, BEA Systems, http://www.bea.com/framework.jsp?CNT=homepage_main.jsp&FP=/content, Pub: Jul. 15, 2005.

IBM, IBM WebSphere Software, http://www-306.ibm.com/software/websphere/#, Pub: Jul. 15, 2005.

JBoss, JBoss.com—Professional Open Source ™ from JBoss Inc., http://www.jboss.com/, Pub: Jul. 15, 2005.

Blogging Software, Business Blogs & Blog Services at TypePad.com, www.typepad.com, Pub: Oct. 12, 2007.

Apache Tomcat, The Apache Software Foundation, http://tomcat.apache.org/, Pub: Oct. 12, 2007.

The Apache Software Foundation, http://apache.org/, Pub: Oct. 12, 2007.

\* cited by examiner

HOSTED APPLICATION SERVER

BACKGROUND OF THE INVENTION

An application server is a software program that runs on a server computer in a computer network for running software applications. Typically, application server software is installed, configured and run by a single trusted user, usually a system administrator or other expert user. For example, a web developer might set up and maintain an application server for applications running on a proprietary website. The problem with existing application servers is they are difficult to set up and configure and are not generally designed for a user without technical expertise. For example, if a typical grandmother wanted to create an application (e.g., to track her family genealogy) and make it available on the web for other family members to view and modify, it would be difficult for her to do so using a standard application server. In addition, the grandmother would have to handle writing and maintaining the code for all features of the application, and set up and maintain her own security model (e.g., for user authentication). It would be desirable to have a way to allow any type of user to develop any type of application. Also, given the growing market for social applications, a solution that facilitates the development of social applications would be particularly useful.

BRIEF SUMMARY

A hosted application server system includes an interface for receiving a request from one of a plurality of users. The hosted application server system further comprises a runtime environment for running a plurality of independent applications, a core configured to receive and respond to a request from one of the applications, and an interface for sending a response to the user, wherein the core has access to a shared data model.

One embodiment of the method of delivering a page to a user includes receiving a request from one of a plurality of users and receiving and responding to a request from one of a plurality of independent applications. The method further comprises accessing a shared data model and sending a response to the user.

Embodiments of the computer program product are embodied in a computer-readable comprising computer instructions for receiving a request from one of a plurality of users, preprocessing the request within a server running a plurality of independent applications, transmitting the preprocessed user request to an application, receiving a response from the application, postprocessing the response, and transmitting the postprocessed response to the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A hosted application server running multiple applications provided by multiple users is disclosed. In some embodiments, the hosted application server provides a secure interface between users and applications, where varying levels of trust between various users and applications can be designated and handled. In some embodiments, the hosted application server includes a shared data model that includes content provided by multiple users. The data in the shared data model can be made available to multiple applications and multiple users.

Figure 1:
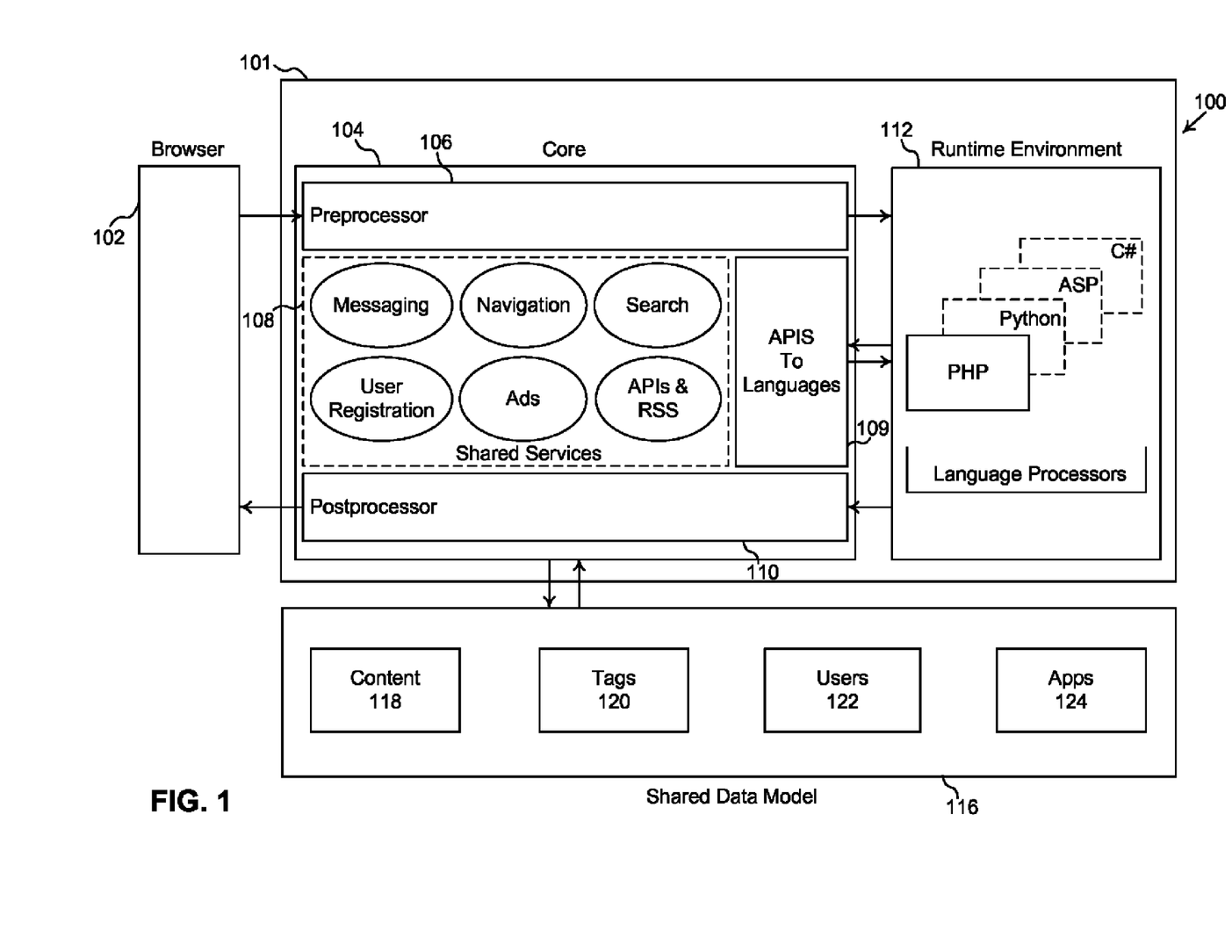
FIG. 1 is a block diagram illustrating an embodiment of a hosted application server.

FIG. 1 is a block diagram illustrating an embodiment of a hosted application server. In the example shown, environment 100 is shown to include hosted application server system 101, browser 102, and shared data model 116. Server system 101 includes core 104 and runtime environment 112. Browser 102 is a web browser or other application capable of viewing data provided over a network, such as the Internet, an intranet or a mobile network.

Core 104 is shown to include preprocessor 106, postprocessor 110, shared services 108, and APIs to languages 109. Preprocessor 106 preprocesses requests from a user at browser 102. For example, preprocessor 106 could include mechanisms for user authentication, security, and session management, as more fully described below. Shared services 108 include various services provided by the host to application developers for use in their applications. For example, shared services 108 could include messaging, navigation, search, user registration, advertising, APIs, and RSS, as more fully described below. Various services not shown could also be provided in various embodiments. For example, external hooks can be provided to other web services such as Amazon, eBay, Google, Visa, Mapquest, etc. APIs 109 can be used to access shared services 108. In some embodiments, core 104 software is written in Java.

Physically, core 104, runtime environment 112, and shared data model 116 can reside on any number of physical devices, each of which can be at any location. In some embodiments, core 104 and runtime environment 112 reside on the same physical device.

Shared data model 116 is a common structure in which data can be stored, shared, and retrieved by multiple applications. Shared data model 116 includes a shared set of data and data types that can be accessed and modified by multiple applications or users. For example, a user or application could add an object to shared data model 116 that can then be accessed by other users and applications. A developer could add a new object type and define attributes associated with that object. That content object type can then be made available to other applications.

Shared data model 116 could include one or more databases or data repositories. Shared data model 116 is shown to include content 118, tags 120, users 122, and applications 124. Examples of content could include photos, comments, reviews, classifieds, or other types of user or application contributed content. Data could be contributed and/or defined by users, applications, or the system. Shared data model 116 could be prepopulated with data. Each object in shared data model 116 can be associated with one or more tags. Objects can be tagged by one or more users. For example, multiple users could tag a particular photo or restaurant review, or a particular application.

Each object can be owned by an application and/or user. In some embodiments, each object is owned by an application and contributed by a user. The owner of an object can designate the object as public or private, where private objects are only provided to the owner or other users designated (e.g., tagged) by the owner (e.g., the owner's friends or family). Each object has a unique object ID in some embodiments.

Various shared services can utilize the data in shared data model 116. For example, a search engine service (e.g., in shared services 108) could be provided that builds an index based on the tags. Advertising can be generated based on tags or content that is retrieved. Profiles can be created based on tag data.

In some embodiments, shared data model 116 includes a SQL database and a search engine that preindexes various queries for faster access to data. In some embodiments, core 104 includes a data access layer for accessing data in shared data model 116.

Runtime environment 112 can run any number of independently written applications. An application can be written in any language that generates HTML, such as PHP, Python, ASP, C#, Java, Javascript, Ruby or .NET or any language that can be used to view information provided over a network (e.g., the Internet, an intranet, a mobile network, or any other type of network). The applications do not all need to be written in the same language. An application includes calls to APIs 109 to access shared services 108.

Any type of application can be developed, any one of which can utilize the set of services and APIs provided by core 104. Examples of applications that could be created include auctions, product reviews, jobs, social networks, alumni networks, etc. Various tools can be provided for application development. For example, wizards, widgets, and example applications can be provided. Widgets could include, for example, listings, user registration, listings, photos, discussions, blogs, reviews, calendars, maps, rankings, ratings, recommendations, reputation, transactions, tagging, etc. Templates could be provided. For example, a marketplace or dating service template could be provided and multiple applications could be independently created based on that template. Tools could be provided for developers of all skill levels. For example, a wizard or a GUI could be provided for beginning computer users, and example applications (e.g., showing calls to various APIs and making use of various services) could be provided to amateur developers. APIs for mobile platforms could be provided, including photo, email, and/or SMS upload/download, GPS tracking, and alerts. Documentation, discussion boards, books, evangelism, and support could also be provided to help users create and maintain applications.

Core 104 maintains security between browser 102 and core 104, and between core 104 and runtime environment 112, as more fully described below. Core 104 can be viewed as a proxy between browser 102 and an application running in runtime environment 112. Core 104 authenticates users so that applications running in runtime environment 112 do not need to handle user authentication. Applications can trust users authenticated by core 104, and users can trust applications that are served by server system 101.

Postprocessor 110 postprocesses responses from applications running in runtime environment 112. For example, post processor 110 assembles output from an application with data from shared data model 116. In some embodiments, a web page is assembled and sent to browser 102, where it is displayed. In some embodiments, the output from the application includes instructions written in HTML. The instructions could include XML tags that refer to certain content object IDs and specify how they should be displayed. The content objects could be retrieved from the content database in shared data model 116 and a page could be assembled based on the specification.

Figure 2:
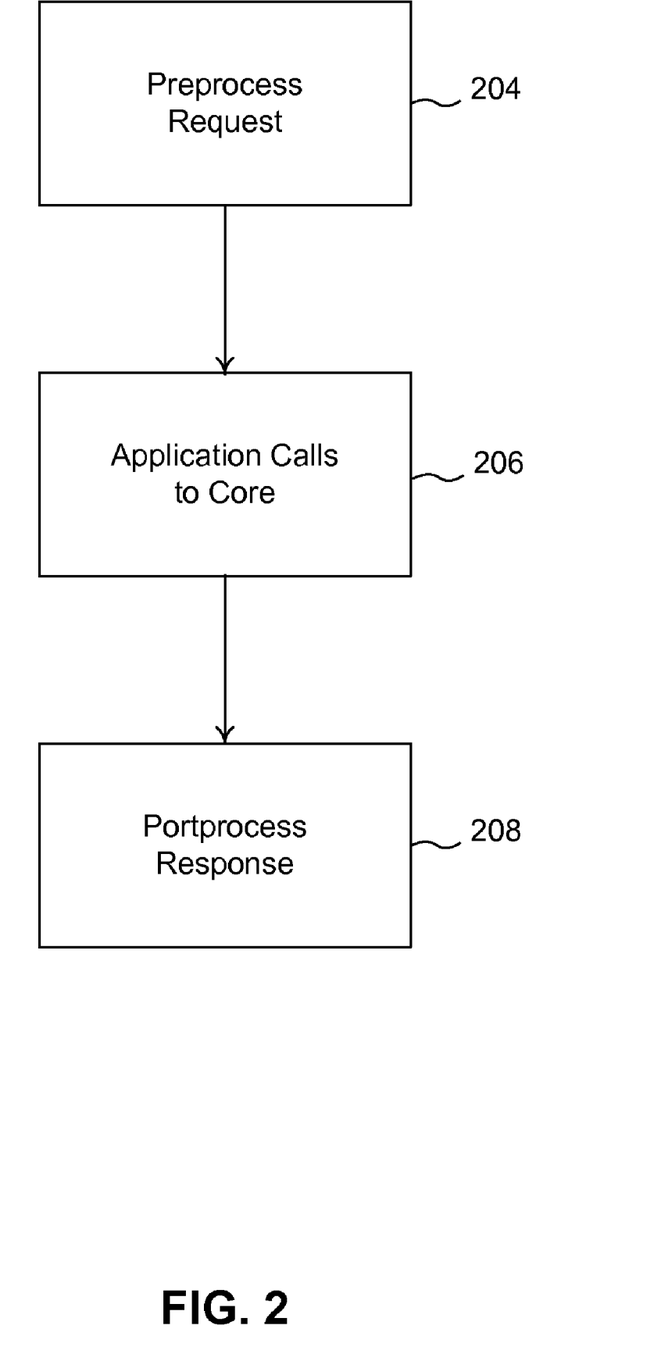
FIG. 2 is a flowchart illustrating an embodiment of a process for handling a user request.

FIG. 2 is a flowchart illustrating an embodiment of a process for handling a user request. In some embodiments, this process is implemented on core 104 when a request to access an application is made (e.g., a user enters the URL associated with the application). In the example shown, the process begins at 204, in which a request is preprocessed. Preprocessing could include, for example, authenticating the request or performing other security related functions. In some embodiments, 204 is performed by preprocessor 106 in environment 100. At 206, application calls to the core are handled. For example, runtime environment 112 executes the application code, which could include calls back to the server, e.g., to retrieve data from shared data model 116. At 208, the response is postprocessed. A response is received from an application and interpreted. For example, XML tags are received, and data is retrieved from the database based on the tags. HTML is generated that includes the data, and the page is delivered to the user. In some embodiments, 208 is performed by postprocessor 110 in environment 100. These processes are more fully described below.

Figure 3A:
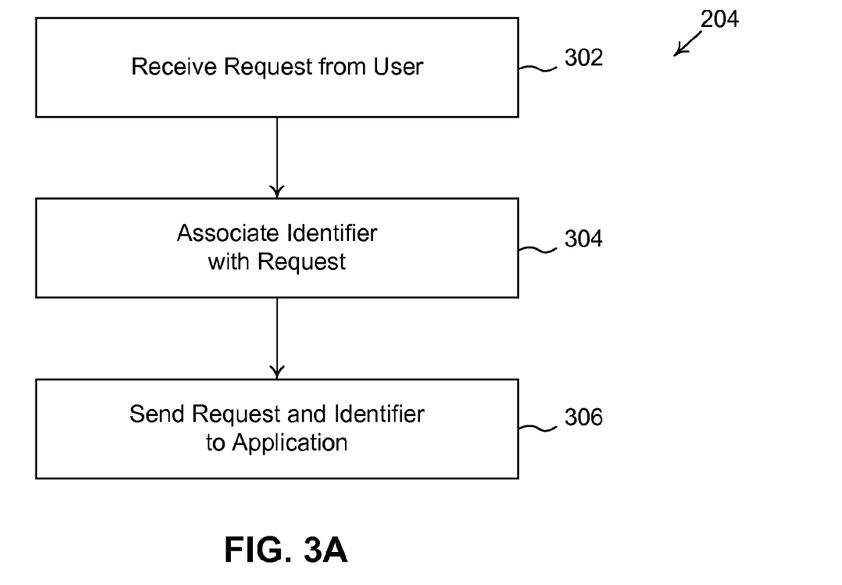
FIG. 3A is a flowchart illustrating an embodiment of a process for preprocessing a user request.

FIG. 3A is a flowchart illustrating an embodiment of a process for preprocessing a user request. In some embodiments, this process is implemented on preprocessor 106. In the example shown, the process begins at 302, in which a request is received from a user. For example, the request could include the URL associated with the application. A username and a password could also be included. In some embodiments, the username could be anonymous or guest. In some embodiments, when the user does not enter a username, the request is handled as if the user was anonymous. At 304, an identifier is associated with the request. The identifier can be based on the application and/or the username. In some embodiments, the user is authenticated and an identifier, such as a security token, is generated for the request. For example, the identifier could be a random number or a hash value. In some embodiments, the lifetime of the security token is one page request. In some embodiments, a security certificate, an identifier associated with the location of the user, such as an IP address, or other identifier is associated with the session. In some embodiments, for each identifier, the username, application, and/or role of that user are stored. Examples of roles include guest, user, or administrator. At 306, the request and identifier are sent to the application. The username and/or role could also be sent to the application for use by the application. The server could store the identifier, username, and role in a lookup table (e.g., in RAM).

Figure 3B:
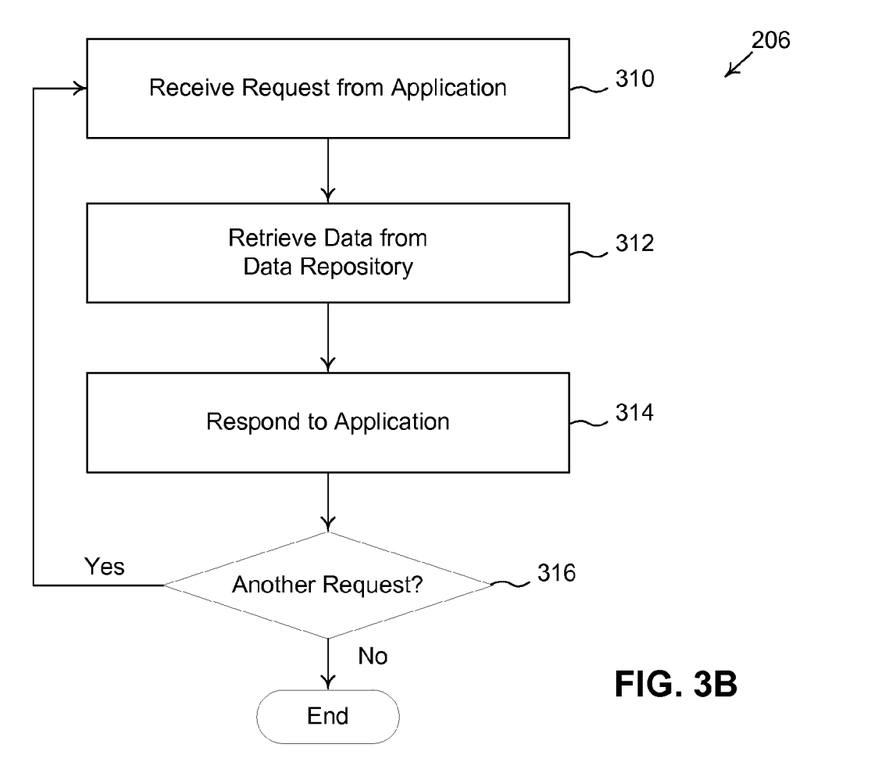
FIG. 3B is a flowchart illustrating an embodiment of a process for handling application requests at a core.

FIG. 3B is a flowchart illustrating an embodiment of a process for handling application requests at a core. In some embodiments, this process is implemented on core 104 when requests are received from an application running in runtime environment 112. In the example shown, the process begins at 310, in which a request is received from the application. In some embodiments, the request includes the identifier that was sent to the application at 306. As such, the server can check the identifier to authenticate the request. The request could be delivered using any appropriate network API, such as SOAP. At 312, depending on the request, data could be retrieved from the shared data model. For example, the request could be a request for all content objects tagged "cat" or all photos (i.e., content objects of type "photo") tagged "cat". At 312, objects are retrieved to satisfy the request. In some embodiments, only content objects that are public or private, but available to that user (as determined by the identifier included in the request), are retrieved. If the user is an anonymous user, only public objects matching the request are retrieved. At 314, a response is sent to the application. For example, all content objects tagged "cat" are sent to the application. The request could be delivered using any network API. At 316, if another request is received, the process returns to 310. Otherwise, the process ends.

Figure 3C:
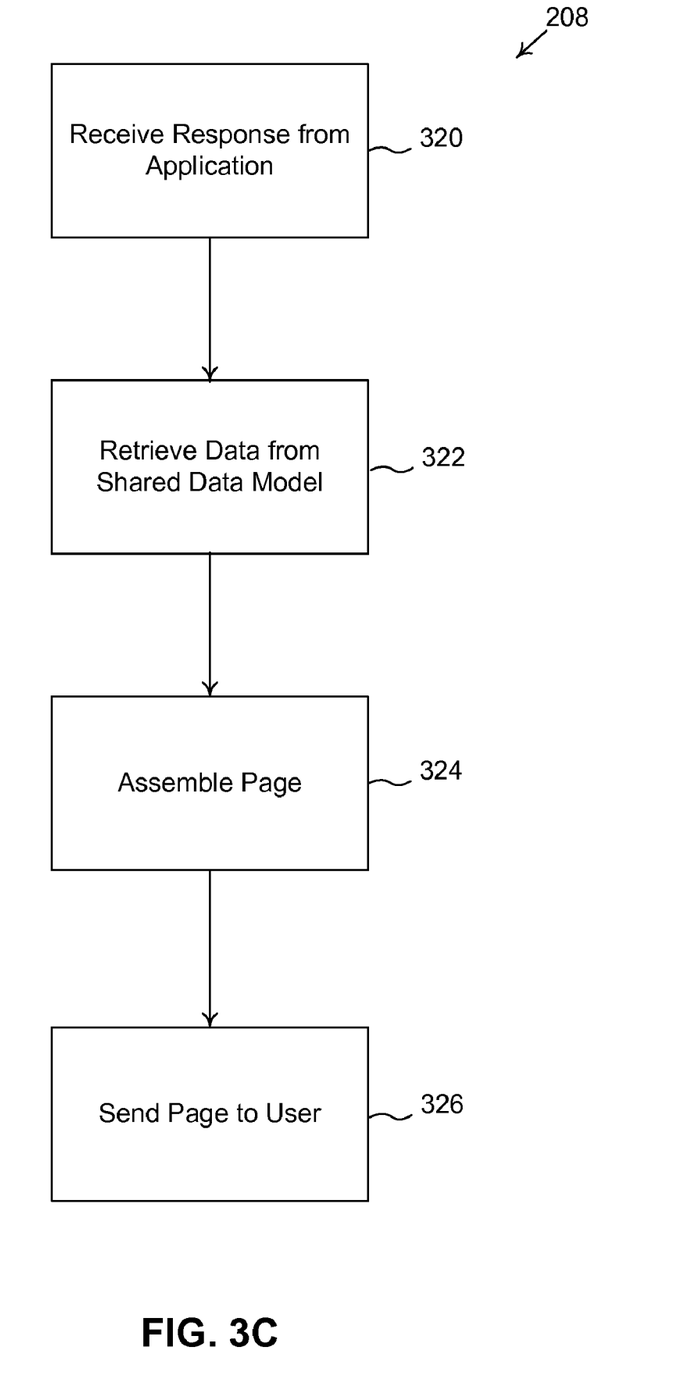
FIG. 3C is a flowchart illustrating an embodiment of a process for postprocessing a response from an application.

FIG. 3C is a flowchart illustrating an embodiment of a process for postprocessing a response from an application. In some embodiments, this process is implemented on postprocessor 110 when a response from an application running in runtime environment 112 is received. In the example shown, the process begins at 320, in which a response is received from the application. In some embodiments, the response includes the identifier that was received from the server at 306. As such, the server can check the identifier to authenticate the response. The response can include object IDs to refer to objects in shared data model 116 and a description of how to display them. At 322, depending on the response, data is retrieved from the shared data model. For example, the response could include a list of object IDs, in which case the objects with those object IDs are retrieved. At 324, a page is assembled based on the response. The page could be formatted for display in a web browser or any other application capable of viewing data provided over a network, such as the Internet, an intranet or a mobile network. The page could include an HTML, XML, PDF, MP3, mobile, or any other type of file.

In some embodiments, an application can reference a view file that describes how an object should be displayed. The view file can be included in the response at 322. In some embodiments, the view file is written in HTML and/or XML. An object can be associated with multiple view files contributed by multiple developers. For example, a developer might create for a particular object a view file to display the object in a small or large area. For example, a developer could create an object of type restaurant review with attributes "name", "image", "review", and "url". The view file could specify that that the image of the restaurant be displayed on a first line, the restaurant name be displayed on a second line, and the review be displayed on a third line. The view file could specify that selecting (e.g., using a mouse to click on) the name of the restaurant would lead to the website of the restaurant. In some embodiments, a view file is retrieved from the application that owns the object to be displayed. In some embodiments, a view file is retrieved from a registry of publicly available view files. Developers can contribute view files to the registry. In some embodiments, if there is no description (e.g., a view file) specified, the objects are displayed according to a default description (e.g., a default view file).

In some embodiments, only content objects that are public, or private but available to the particular user and/or application (as determined by the identifier included in the response), are retrieved. For example, if a content object having object ID 123 is specified, and object ID 123 is private and owned by an application other than the one responding, core 104 will not provide that object to the requesting application. Similarly, if that object is private and owned by another user, that object will not be provided. At 326, the page is sent to the user. As such, the core can be configured to enforce security of content based on the user or the application.

Figure 4:
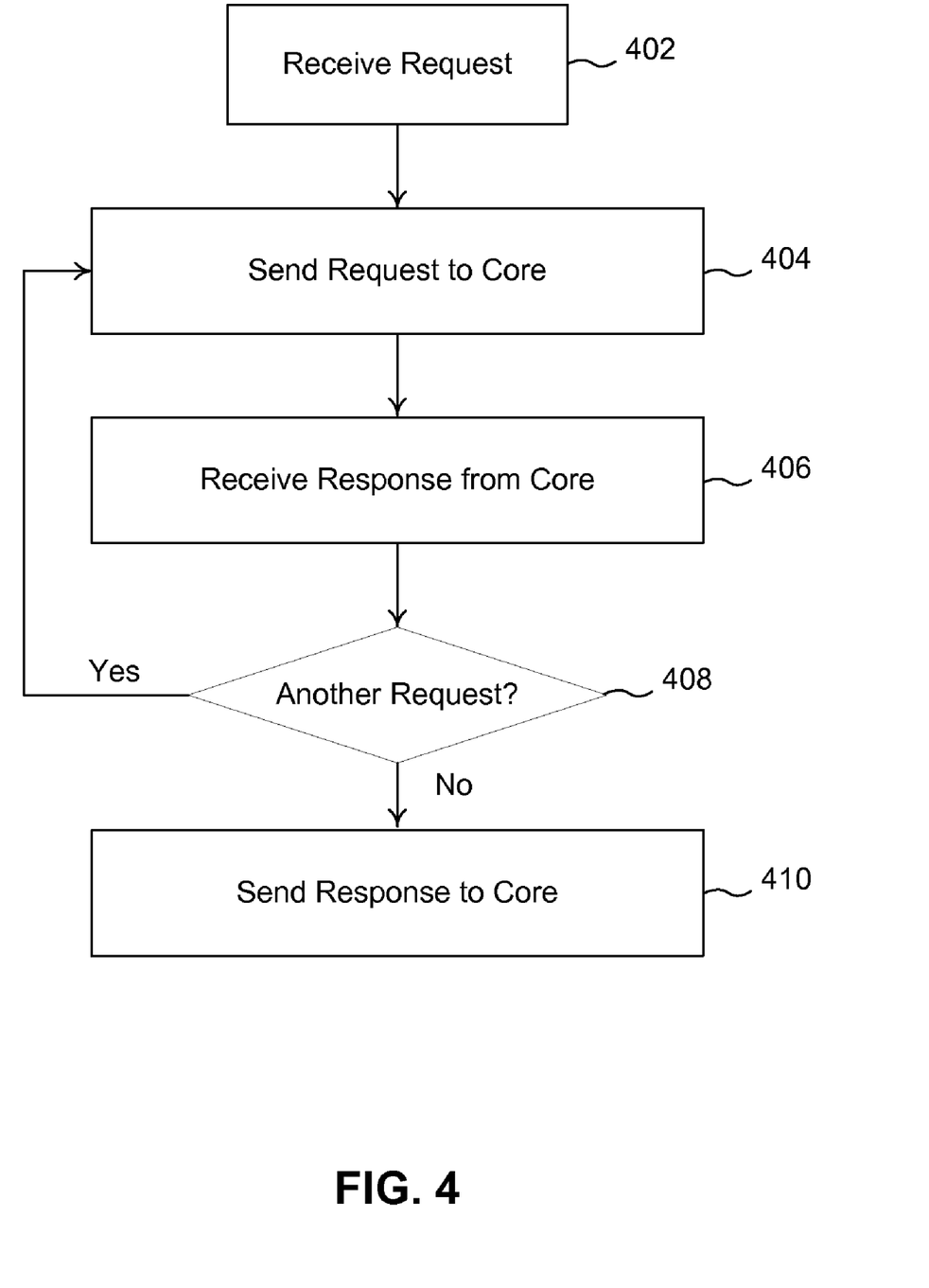
FIG. 4 is a flowchart illustrating an embodiment of a process for responding to a user request.

FIG. 4 is a flowchart illustrating an embodiment of a process for responding to a user request. In some embodiments, this process is implemented in runtime environment 112. In the example shown, the process begins at 402, in which a request is received. In some embodiments, the request includes the identifier and/or role that was sent from the server at 306. As such, the server can check the identifier to determine that the user was authenticated (or is an anonymous user or guest, for example). The application can then handle the request based on the user and/or the role of the user with that application. Different application code could be executed based on the user and/or the role. For example, one application might allow a certain user to contribute content, while another application does not. In this way, the creator of each application can decide the rights of each user accessing that application. For example, if the user is anonymous, the application could send a response (i.e., the process would skip to 408, as described more fully below) to send a web page that notifies the user that the user needs to login in order to access this particular application. In some embodiments, the user can have access to different (e.g., better) content by paying a subscription fee to change the user's role to "subscriber". As such, the core can be configured to enforce security of the application based on the user or a role associated with the user.

At 404, depending on the application instructions, a request (or query) is sent to the core. For example, a request to retrieve all photos tagged "cat" is sent to the core. In some embodiments, the request includes the identifier received at 306. In some embodiments, the request is delivered using a network API, such as SOAP. For example, a binding can be provided that interprets a PHP request from the application and forwards the request to the core using SOAP. At 406, a response is received from the core. For example, all photos tagged "cat" are received. The data received from the core is optionally processed. For example, the photos tagged "cat" could be pruned to include only the photos that are also tagged by the user's friends (assuming a list of friends is associated with the user) and/or were added within the last 24 hours. At 408, if another request is made, the process returns to 404. Otherwise, at 410, a response is sent to the core. In some embodiments, the response includes the identifier received at 306. The response could include the data retrieved at 406. In some embodiments, the response includes semantic markup tags, such as XML tags, that refer to objects in shared data model 116 (e.g., by object ID), and specifies a view file.

Figure 5:
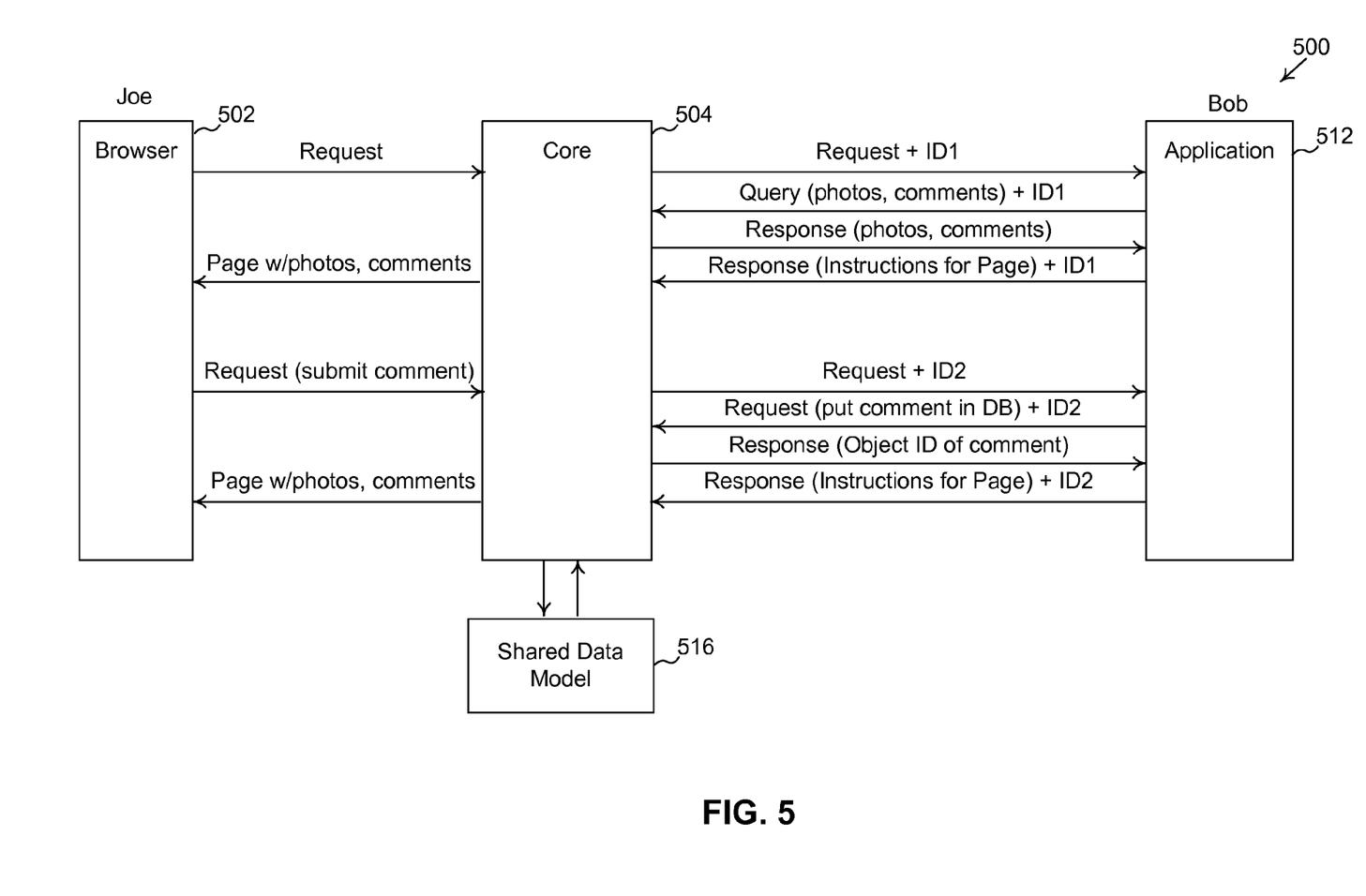
FIG. 5 is a block diagram illustrating an embodiment of an application running on a hosted application server.

FIG. 5 is a block diagram illustrating an embodiment of an application running on a hosted application server. In the example shown, environment 500 is shown to include browser 502, core 504, application 512, and shared data model 516. The hosted application server includes core 504 and a runtime environment running application 512. In this example, user Joe is running browser 502. Application 512 is owned by Bob. Bob is planning a vacation with friends to Hawaii. Application 512 displays pictures (from shared data model 516) of places in Hawaii along with his friends' comments on each place. The comments are private and not visible to users who are not Bob's friends. Joe is one of Bob's friends.

In this example, Joe requests Bob's application (e.g., by entering the URL of Bob's application). A request is sent to core 504 including username joe and a password. Core 504 receives the request, authenticates Joe, and associates an identifier ID1 with the request. Core 504 sends the request, ID1, and optionally the username and role to application 512. Application 512 receives the request and can determine that the user is joe. Application 512 sends a query to core 504 for photos of Hawaii and comments on those photos. The query includes the identifier ID1 so that core 504 can authenticate the request. Core 504 receives the request, checks the identifier, and retrieves all content objects of type photo that are tagged Hawaii and all content objects of type comment made by Bob and his friends. Core 504 only retrieves objects that are public or owned by Bob and his friends. These objects are sent to application 512. Application 512 receives the objects.

In this example, the structure of the comment object includes the object ID of the photo being commented on. As such, application 512 can identify the photos that were commented on by Bob and his friends, and then select a few other photos (e.g., the two photos of Hawaii with the most tags) to display on the page for Joe. Application 512 sends a response to core 504. The response includes identifier ID1 so that the server can authenticate the response. The response includes the object IDs of the five photos, the object ID's of the comments, and a description of how they all should be displayed (e.g., view files). Core 504 receives the response, assembles the page of photos and comments according to the response, and sends the page to browser 502. Joe then sees in the page the photos commented on by Bob and his friends, and the two photos of Hawaii with the most tags.

Joe views the page of photos and comments, and decides to add a comment of his own. Joe enters a comment, and hits a submit button. A request is sent to core 504. Core 504 authenticates Joe and associates a new identifier, ID2, with the request. The request is forwarded along with ID2 to application 512. Application 512 receives the request and identifies the user as "joe". Application 512 tags the comment as private and sends a request to core 504 to put the comment in shared data model 516. The request includes ID2. Core 504 receives the request, checks the identifier, and puts the data in shared data model 516. An object ID is associated with the object. In some embodiments, a response is sent to application 512 indicating the object ID of the comment. Application 512 sends a response to core 504 including the object IDs of the five photos, the object ID's of the old comments, and the object ID of the new comment. Text can be included, such as "Your comment has been accepted and is only viewable by you and your friends." Core 504 assembles the page of photos and comments according to the response, and sends it to browser 502 for display. Joe then sees in the page the photos commented on by Bob and his friends, the two photos of Hawaii with the most tags, Joe's newly added comment, and the text "Your comment has been accepted and is only viewable by you and your friends."

In this example, the comment submitted by Joe is private. If it were instead public, then it would then become available to other applications and users for accessing and viewing. In this way, the shared data model can receive data from multiple applications and share data with multiple applications.

Numerous other applications can be written that retrieve and display the same data objects in various ways. For example, multiple users can write multiple applications that store photo objects in different ways. For example, each photo object could include metadata indicating where the photo was taken. The application could retrieve all photos of Hawaii, determine their locations, and display them on a map of Hawaii at the location at which they were taken. Another application written by another independent user could display the same photos in order of where they lie on the RGB spectrum.

Any type of content object could be used by any application. An application could include content contributed by other applications. For example, Bob could create an application that displays restaurant reviews contributed by his friends using his application. In addition, Bob might include other restaurant reviews contributed by other applications in his restaurant review application. Bob might also include classified ads on a portion of his restaurant reviews page because there might be an incentive provided to include them.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hosted application server system, including:
   a computer readable storage device comprising:
   an interface for receiving a request from one of a plurality of users;
   a runtime environment for running a plurality of independently authored applications, at least two of the applications being written in different programming languages;
   a shared data model;
   a core configured to receive and respond to a request from one of the independently authored applications for a content object from the shared data model; and
   an interface for sending a response to the user;
   wherein the shared data model is accessed and modified by more than one of the plurality of independently authored applications and stores data comprising:
   a plurality of object types, an object type having a plurality of attributes that define data structure of a content object to which the object type corresponds, wherein one or more object types are user defined, and
   a plurality of user-contributed content objects, wherein:
   each user-contributed content object is associated with at least one of the object types, has data structured according to that object type, and is designated as being either publicly available to users other than a user who contributed the object or privately available only to the user who contributed the object,
   at least one of the user-contributed content objects is accessed by different ones of the plurality of independently authored applications, and at least one of the user-contributed content objects has a user attribute identifying the user who contributed the content object to the shared data model.

2. The system of claim 1, wherein the applications are run at various levels of trust.

3. The system of claim 1, wherein the core is further configured to authenticate the user.

4. The system of claim 1, wherein the core is further configured to enforce security of the application based on the user or the application.

5. The system of claim 1, wherein the core is further configured to enforce security of the application based on a role associated with the user.

6. The system of claim 1, wherein the core is further configured to enforce security of content based on the user.

7. The system of claim 1, wherein the shared data model includes content associated with at least one user.

8. The system of claim 1, wherein at least one content object is associated with a view file that describes how the content object should be displayed, and the core is further configured to display the content object based at least in part on the associated view file.

9. The system of claim 1, wherein the shared data model comprises at least one content object associated with tags specified by a plurality of users.

10. The system of claim 1, wherein the users are handled at various levels of trust.

11. The system of claim 1, wherein the core is further configured to associate an identifier with the request.

12. The system of claim 1, wherein the core is further configured to associate an identifier with the request, wherein the identifier is associated with a role, a username, or an application.

13. The system of claim 1, wherein the core is further configured to associate an identifier with the request, wherein the identifier is a security token.

14. The system of claim 1, wherein the response sent to the user includes data from a shared data model.

15. The system of claim 1, wherein the response sent to the user includes advertising data.

16. The system of claim 1, wherein the response to the request from one of the applications includes data from the shared data model.

17. The system of claim 1, wherein the response from the application includes XML or HTML code.

18. The system of claim 1, wherein the response sent to the user includes HTML code.

19. The system of claim 1, wherein the core is further configured to provide system services.

20. The system of claim 1, wherein the server system is configured to run on the Internet.

21. The system of claim 1, wherein the plurality of independently authored applications are web-based applications.

22. The system of claim 1, wherein at least one of the user contributed objects has an object type defined by a user different from a user who contributed the object.

23. The system of claim 1, wherein the hosted application server has a plurality of language processors adapted to run the plurality of independently authored applications.

24. The system of claim 23, wherein the at least two applications written in different languages are written in procedural programming languages and generate HTML.

25. The system of claim 1, wherein at least one of the object types is accessed by different ones of the plurality of independently authored applications.

26. The system of claim 1, wherein the designation of public or private availability of a user-contributed content object is specified by the user who contributed the object.

27. The system of claim 1, wherein the user who contributed the object has an associated list of friends, and wherein each user-contributed content object is designated as being publicly available to users other than a user who contributed the object, or privately available only to the user who contributed the object or to a friend in the associated list of friends.

28. A method of delivering a page to a user, including:
receiving a request from one of a plurality of users;
receiving and responding to a request from one of a plurality of independently authored applications for a content object from a shared data model, at least two of the applications being written in different programming languages;
accessing the shared data model; and
sending a response to the user;
wherein the shared data model can be accessed and modified by more than one of the plurality of independently authored applications, and stores data comprising:
a plurality of object types, an object type having a plurality of attributes defining a data structure of a content object to which the object type corresponds, wherein one or more object types are user defined, and
a plurality of user-contributed content objects, wherein:
each user-contributed content object is associated with at least one of the object types, has data structured according to that object type, and is designated as being either publicly available to users other than a user who contributed the object or privately available only to the user who contributed the object,
at least one of the user-contributed content objects is accessed by different ones of the plurality of independently authored applications, and
at least one of the user-contributed content objects has a user attribute identifying the user who contributed the content object to the shared data model.

29. A computer program product for delivering a page to a user, the computer program product being persistently embodied in a computer readable storage medium and comprising computer instructions for:
receiving a request from one of a plurality of users;
receiving and responding to a request from one of a plurality of independently authored applications for a content object from a shared data model, at least two of the applications being written in different programming languages;
accessing the shared data model; and
sending a response to the user;
wherein the shared data model can be accessed and modified by more than one of the plurality of independently authored applications, and stores data comprising:
a plurality of object types, an object type having a plurality of attributes defining data structure of a content object to which the object type corresponds, wherein one or more object types are user defined, and
a plurality of user-contributed content objects, wherein:
each user-contributed content object is associated with at least one of the object types, has data structured according to that object type, and is designated as being either publicly available to users other than a user who contributed the object or privately available only to the user who contributed the object, at least one of the user-contributed content objects is accessed by different ones of the plurality of independently authored applications, and at least one of the user-contributed content objects has a user attribute identifying the user who contributed the content object to the shared data model.

30. A method of delivering a page to a user, including:

receiving a request from a user for a content object of a shared data model;

preprocessing the request within a server running a plurality of independently authored applications, at least two of the applications being written in different programming languages;

transmitting the preprocessed user request to an application;

receiving a response from the application, the response including the content object;

postprocessing the response; and transmitting the postprocessed response to the user;

wherein the shared data model can be accessed and modified by more than one of the plurality of independently authored applications, and stores data comprising:

a plurality of object types, an object type having a plurality of attributes defining data structure of a content object to which the object type corresponds, wherein one or more object types are user defined, and a plurality of user-contributed content objects, wherein:

each user-contributed content object is associated with at least one of the object types, has data structured according to that object type, and is designated as being either publicly available to users other than a user who contributed the object or privately available only to the user who contributed the object, at least one of the user-contributed content objects is accessed by different ones of the plurality of independently authored applications, and at least one of the user-contributed content objects has a user attribute identifying the user who contributed the content object to the shared data model.

31. The method of claim 30, further including receiving and responding to a request from the application.

32. The method of claim 30, wherein the applications are run at various levels of trust.

33. The method of claim 30, wherein preprocessing the request from the user includes authenticating the user.

34. A hosted application server system, including:

a computer readable storage device comprising:

an interface for receiving a request from one of a plurality of users for a content object of a shared data model;

a runtime environment for running a plurality of independently authored applications, at least two of the applications being written in different programming languages;

a core configured to:

preprocess the request from the user;

receive and respond to a request from one of the applications, the response including the content object; and postprocess a response from the application; and an interface for sending the postprocessed response to the user;

wherein the shared data model can be accessed and modified by more than one of the plurality of independently authored applications, and stores data comprising:

a plurality of object types, an object type having a plurality of attributes defining data structure of a content object to which the object type corresponds, wherein one or more object types are user defined, and a plurality of user-contributed content objects, wherein:

each user-contributed content object is associated with at least one of the object types, has data structured according to that object type, and is designated as being either publicly available to users other than a user who contributed the object or privately available only to the user who contributed the object, at least one of the user-contributed content objects is accessed by different ones of the plurality of independently authored applications, and at least one of the user-contributed content objects has a user attribute identifying the user who contributed the content object to the shared data model.

35. A computer program product for delivering a page to a user, the computer program product being persistently embodied in a computer readable storage medium and comprising computer instructions for:

receiving a request from a user for a content object of a shared data model;

preprocessing the request within a server running a plurality of independently authored applications, at least two of the applications being written in different programming languages;

transmitting the preprocessed user request to an application;

receiving a response from the application, the response including the content object;

postprocessing the response; and transmitting the post processed response to the user;

wherein the shared data model can be accessed and modified by more than one of the plurality of independently authored applications and stores data comprising:

a plurality of object types, an object type having a plurality of attributes defining data structure of a content object to which the object type corresponds, wherein one or more object types are user defined, and a plurality of user-contributed content objects, wherein:

each user-contributed content object is associated with at least one of the object types, has data structured according to that object type, and is designated as being either publicly available to users other than a user who contributed the object or privately available only to the user who contributed the object, at least one of the user-contributed content objects is accessed by different ones of the plurality of independently authored applications, and at least one of the user-contributed content objects has a user attribute identifying the user who contributed the content object to the shared data model.

* * * * *